Feb. 5, 1935.   A. A. BAILEY, JR   1,990,361
EXPOSURE METER
Filed June 27, 1932

INVENTOR
ALMONT A. BAILEY JR
BY
ATTORNEY

Patented Feb. 5, 1935

1,990,361

UNITED STATES PATENT OFFICE 1,990,361

EXPOSURE METER

Almont A. Bailey, Jr., Portland, Oreg.

Application June 27, 1932, Serial No. 619,490

5 Claims. (Cl. 88—23)

My invention relates to meters for indicating devices, which are generically classified as exposure meters. Said meters have particular use in the photographic art for measuring, exactly and mechanically, the degree of light with relation to the time necessary for making a proper exposure of photographic film. In photographic work there are two variable operating factors which must be considered; namely, the size of the aperture opening and the exposure interval. It is common practice at the present time to provide meters adapted to measure either one of said two variable factors. Thus, for motion picture cameras which have relatively fixed exposure intervals, meters are provided for determining the aperture opening. Exposure meters are provided and calibrated to register directly the proper exposure interval in a given case upon a scale calibrated for a fixed aperture size. To determine the proper exposure interval for another aperture size, it is necessary to estimate or calculate said exposure interval with relation to the standard aperture opening.

The principal object of my invention is to provide an exposure meter of this character capable of providing a direct reading in terms of both varying aperture sizes and exposure intervals. This object is attained by providing a variable shutter or iris diaphragm which is adjustable and which is calibrated to correspond to the similar devices upon a camera and the reading upon the indicating devices of said meter thus records a proper exposure interval for a camera for any aperture setting within the normal operating range.

The details of construction and the mode of operation of my invention are hereinafter described with reference to the accompanying drawing, in which.

My improved exposure meter comprises a casing $a$ preferably tubular in form housing at one end a standard meter $b$. The details of a meter of this character play no part in my invention and therefore reference is had to the catalogs of the Weston Electrical Instrument Corporation for the details of their Type 301 millammeter. It is to be understood that my invention is not limited to this specific type of meter, this being illustrated and referred to as one specific element which adequately serves its purpose. A photoelectric cell $c$ is also housed within said casing, preferably immediately adjacent the meter $b$. A closed electric circuit $a'$ is made between the cell $c$ and the meter $b$, so that said meter can measure the fluctuations in electrical output of said cell under the influence of light to be measured. A photo-electric cell which has proved efficient in Model 594 Weston photo-electrical cell, which is termed their photronic cell. The cell is arranged with its face extending away from the meter and directly towards the aperture $d$ in the casing $a$.

Figures 1, 3:
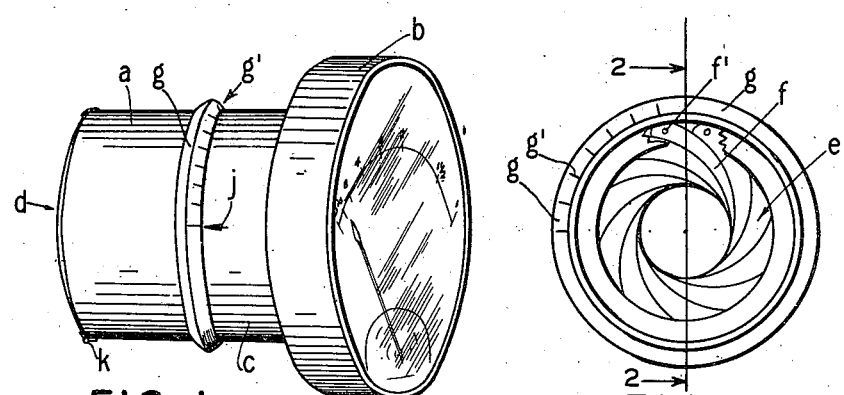
Fig. 1 is a perspective view of a meter embodying my invention.
Fig. 3 is a cross-sectional view thru said meter taken on the line 3—3 in Fig. 2.
Figure 2:
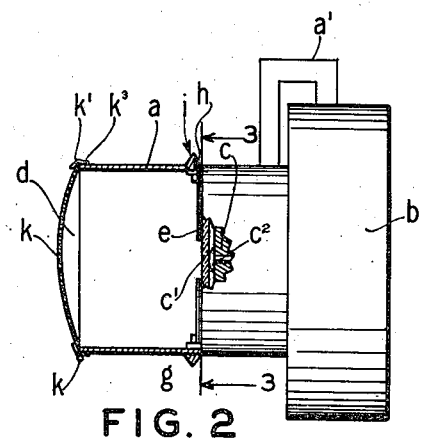
Fig. 2 is an elevation thereof with portions shown broken away and in section to disclose details of construction, the portion of said figure shown in section being taken on the line 2—2 in Fig. 3.

Except for said aperture the housing is substantially light proof and thus all of the light which enters said casing is arranged to strike the face of said cell. Extending intermediate the face of said cell and the aperture is a shutter element $e$ adapted to vary the amount of light passing from said aperture to the face of said cell. Said adjustable shutter element preferably is in the form of an iris diaphragm, as is shown in Fig. 3, which is one of the most widely accepted means of varying the aperture size in photographic work, for the reason that it provides a substantially circular aperture in all its various settings. By the use of such a device, conditions found in standard photographic cameras are closely simulated and thus an exact measurement is had by the use of my improved meter.

Said iris diaphragm comprises a plurality of irregular members $f$, pivoted as at $f'$, and adjustable by a movable ring $g$ extending exteriorly of the casing and bearing thereon. Said ring is joined to the operating mechanism of said iris diaphragm by a handle $h$ extending thru a slot $i$ in the casing and the ring $g$ overlies said slot and tends to serve as a cover element for said slot.

A registering marker $j$ is inscribed upon the casing and the ring $g$ is calibrated with the scale $g'$. It is obvious that a corresponding result would be attained if the scale were inscribed upon the casing and the registering marker carried by the ring. I deem it preferable, however, to arrange the scale upon the inclined surface of the ring for the reason that said scale is thus clearly visible from the same vantage point and at the same time that the face of the meter is examined for exposure interval. The scale g' is preferably calibrated for the so-called "f" values. The scale of "f" values is the generally accepted manner of indicating aperture settings and indicating the ratio between the size of the aperture opening and the focal length of the photographic lens.

In the modification shown in Figs. 1 to 4 inclusive, the iris diaphragm extends in a plane lying immediately exteriorly of the crystal cover c' of the cell c. The iris diaphragm also has a minimum aperture setting which corresponds substantially to the size of the non-photo-sensitive central button c2 of said cell. Inasmuch as a meter of this character must measure and indicate very slight changes in light intensity, it is essential that no factors enter into the problem of recording which will affect the exact indication necessarily obtained. Placing the iris immediately adjacent the non-sensitive central button tends to eliminate shadows being thrown across the photo-sensitive portion of the cell by the iris itself. The making of the iris in its closed position in registration with the periphery of the button c2 also tends to eliminate from the necessary calculation the effect of light directed upon said non-photo-sensitive surface. In other words this difficulty is eliminated in two manners in my improved meter. First, because the shutter or diaphragm is arranged in close proximity to the cell and, second, that the housing extending between the iris diaphragm and the aperture serves to shade the mechanism and to cut off beams of light which would strike the face of the cell at a more oblique angle.

Meters of this character in photographic work are called upon to measure degrees of light intensity both indoors and outdoors. Experience has indicated that a meter of sufficient range to indicate said variance in light intensity over the entire field of use is not sufficiently delicate to be of utmost service. That is, a meter of five milliamperes is sufficient to record the difference in light intensity over the entire range but does not register as accurately and is not so sensitive as a meter having a range of but one milliampere. To utilize a meter of the lesser range, I provide two scales upon the face of the meter. One scale a2 indicates light intensities in terms of proper exposure intervals when the aperture d is uncovered and the other scale a3 indicates exposure intervals when the aperture is shielded by a diffusing screen k. The meter is used with the diffusing screen in place for outdoor work, as in bright sunlight, and with the screen removed for exposures indoors or otherwise in dim light. Said diffusing screen preferably is made of translucent glass and is selected to cut down the light to such a degree that the scales a2, and a3 will be substantial continuations of each other. That is, the scale a3 measures light intensities of from one second to one-two-hundredths of a second, while the scale a2 indicates exposure intervals of from one second to thirty seconds, for example.

The screen k is mounted in an annular holder k', which is hingedly secured to the casing as at k2, and is adapted to be swung into and out of operative position, a snap k3 holding the screen in position over the aperture d when said meter is used outdoors.

Figure 5:
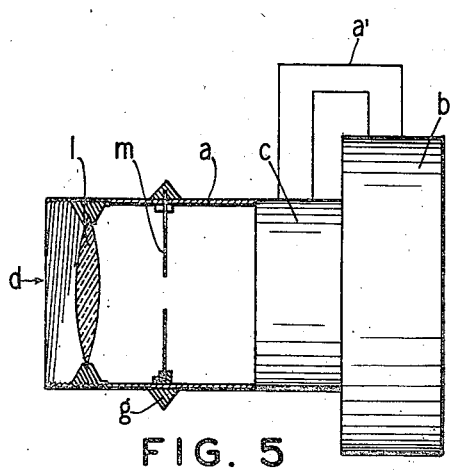
Fig. 5 is a section similar to Fig. 2 taken thru an alternative embodiment of my invention.
Figure 4:
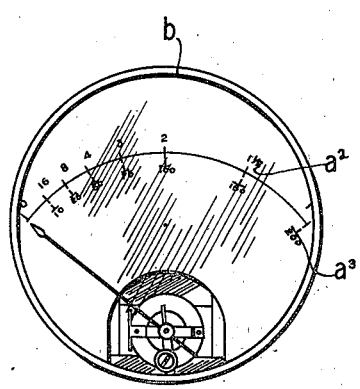
Fig. 4 is an elevation of the meter end of said device showing the manner in which the face of the meter is calibrated.

In Fig. 5 I show a modification of my invention which is similar to the device shown in the previous figures, except that a lens l is provided for directing the light upon the face of the cell c. A single meniscus lens is shown and the iris diaphragm m is arranged a substantial distance from the face of the cell c. Thus all of the light which enters into the aperture d is refracted by the lens thru the aperture in the diaphragm m and is diffused across the entire face of the cell c. In this manner the area of the face of the photo-electric cell which is occupied by the non-sensitive central button c' does not appreciably affect the discharge from the photo-electric cell under any setting of the diaphragm, or variable shutter m.

I claim:

1. An exposure meter comprising a light-proof casing defining a single aperture, said casing housing a photo-electric cell provided with a nonphoto-sensitive center portion, facing said aperture but spaced therefrom, transversely arranged shading devices including a shutter element adapted to define a variable opening extending across said aperture and intermediate the cell and said aperture lying in a plane immediately adjacent the face of said cell, said shading device defining an opening concentric with the nonphoto-sensitive portion of said cell, indicating devices operatively connected with said shading devices, said indicating devices comprising relatively adjustable scale and marker elements, said scale being calibrated to correspond with the aperture opening readings of a camera, and a meter element electrically connected to said cell and calibrated in units of time indicating exposure intervals.

2. An exposure meter comprising a light-proof casing defining a single aperture, said casing housing a photo-electric cell provided with a non-photo-sensitive center portion, facing said aperture but spaced therefrom, transversely arranged shading devices including an iris diaphragm extending across said aperture and intermediate the cell and said aperture lying in a plane immediately adjacent the face of said cell, said shading device defining an opening concentric with the nonphoto-sensitive portion of said cell, indicating devices operatively connected with said shading devices, said indicating devices comprising relatively adjustable scale and marker elements, said scale being calibrated to correspond with the aperture opening readings of a camera, and a meter element electrically connected to said cell and calibrated in units of time indicating exposure intervals.

3. An exposure meter comprising a light-proof casing defining a single aperture, said casing housing a photo-electric cell facing said aperture but spaced therefrom, shading devices extending intermediate the cell and said aperture, indicating devices operatively connected with said shading devices including a scale calibrated in camera aperture opening readings, an adjustable diffusing screen adapted in one position to extend across the aperture, and a meter element electrically connected to said cell, said meter provided with a plurality of scales each calibrated in different units of time of exposure intervals, said diffusing screen having a factor of opacity sufficient exactly to increase the measurable length of the units of time to throw the reading from one meter scale to another, whereby when the diffusing screen is arranged across the aperture the instrument is calibrated for the use of one of said meter scales while when the screen is arranged out of registration therewith the instrument is calibrated for the use of another meter scale.

4. An exposure meter comprising a light-proof casing defining a single aperture, said casing housing a photo-electric cell facing said aperture but spaced therefrom, shading devices extending intermediate the cell and said aperture, indicating devices operatively connected with said shading devices including a scale calibrated in camera aperture opening readings, an adjustable diffusing screen adapted in one position to extend across the aperture, and a meter element electrically connected to said cell, said meter provided with a plurality of scales each calibrated in different units of time of exposure intervals, said scales being substantial continuations of each other, said diffusing screen having a factor of opacity sufficient exactly to increase the measurable length of the units of time to throw the reading from one meter scale to another, whereby when the diffusing screen is arranged across the aperture the instrument is calibrated for the use of one of said meter scales while when the screen is arranged out of registration therewith the instrument is calibrated for the use of another meter scale.

5. An exposure meter comprising a light-proof casing defining a single aperture, said casing housing a photo-electric cell facing said aperture but spaced therefrom, shading devices including a shutter element adapted to define a variable aperture extending across said aperture and extending intermediate the cell and said aperture, indicating devices operatively connected with said shading devices including a scale calibrated in camera aperture opening readings, an adjustable diffusing screen adapted in one position to extend across the aperture, and a meter element electrically connected to said cell, said meter provided with a plurality of scales each calibrated in different units of time of exposure intervals, said diffusing screen having a factor of opacity sufficient exactly to increase the measurable length of the units of time to throw the reading from one meter scale to another, whereby when the diffusing screen is arranged across the aperture the instrument is calibrated for the use of one of said meter scales while when the screen is arranged out of registration therewith the instrument is calibrated for the use of another meter scale.

ALMONT A. BAILEY, Jr.